United States Patent [19]
Kido

[11] Patent Number: 5,960,326
[45] Date of Patent: Sep. 28, 1999

[54] RADIO APPARATUS OUTPUTTING AN ALARM PRIOR TO A SCHEDULED TIME

[75] Inventor: Toru Kido, Shizuoka, Japan

[73] Assignee: NEC Corporation, Tokyo, Japan

[21] Appl. No.: 08/944,301

[22] Filed: Oct. 6, 1997

[30] Foreign Application Priority Data

Oct. 8, 1996 [JP] Japan .................................. 8-267432

[51] Int. Cl.[6] .................................................. H04Q 7/12
[52] U.S. Cl. ...................... 455/31.2; 455/414; 455/31.3; 455/517; 455/38.1
[58] Field of Search .................................. 455/414, 31.2, 455/31.3, 38.1, 38.2, 38.4, 38.5, 556; 340/825.22, 825.44, 825.54; 379/88.25

[56] References Cited

U.S. PATENT DOCUMENTS

| | | | |
|---|---|---|---|
| 4,851,829 | 7/1989 | DeLuca et al. | 340/825.44 |
| 4,872,005 | 10/1989 | DeLuca et al. | 340/825.44 |
| 5,541,981 | 7/1996 | Lynn | 379/88.25 |
| 5,623,242 | 4/1997 | Dawson, Jr. et al. | 455/38.1 |
| 5,666,651 | 9/1997 | Wang | 455/512 |
| 5,878,033 | 3/1999 | Mouly | 455/517 |

*Primary Examiner*—Wellington Chin
*Assistant Examiner*—Yemane Woldetatios
*Attorney, Agent, or Firm*—Scully, Scott, Murphy & Presser

[57] ABSTRACT

In a radio apparatus outputting an alarm prior to a scheduled time, when the receiving part 2 receives a schedule message, first the radio apparatus notifies the reception through the notifying part 8. When notifying the reception, it judges whether or not a user has confirmed reception of the schedule message, namely, whether or not the user has pressed the switch part 10. When the user has pressed the switch part 10, it sets the scheduled time shown by the schedule message as an alarm time. On the other hand, in case that the user has not pressed the switch part 10 in response to the notification of reception it sets as an alarm time the time earlier by a predetermined time than the scheduled time shown by the schedule message. It compares the current time data Se outputted from the timer part 9 and the alarm time with each other and in case that the current time data Se and the alarm time coincide with each other it outputs an alarm through the notifying part 8.

27 Claims, 12 Drawing Sheets

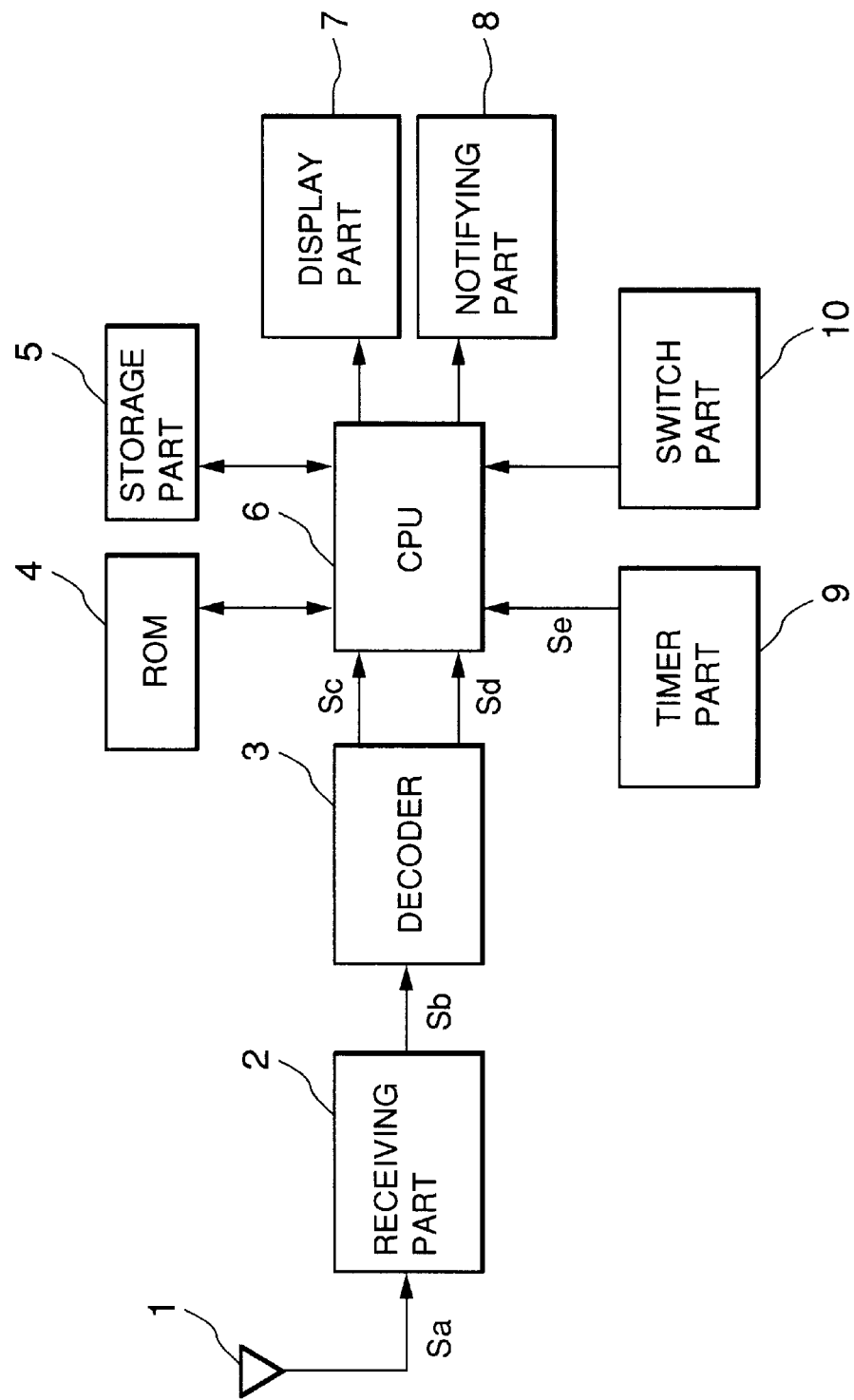

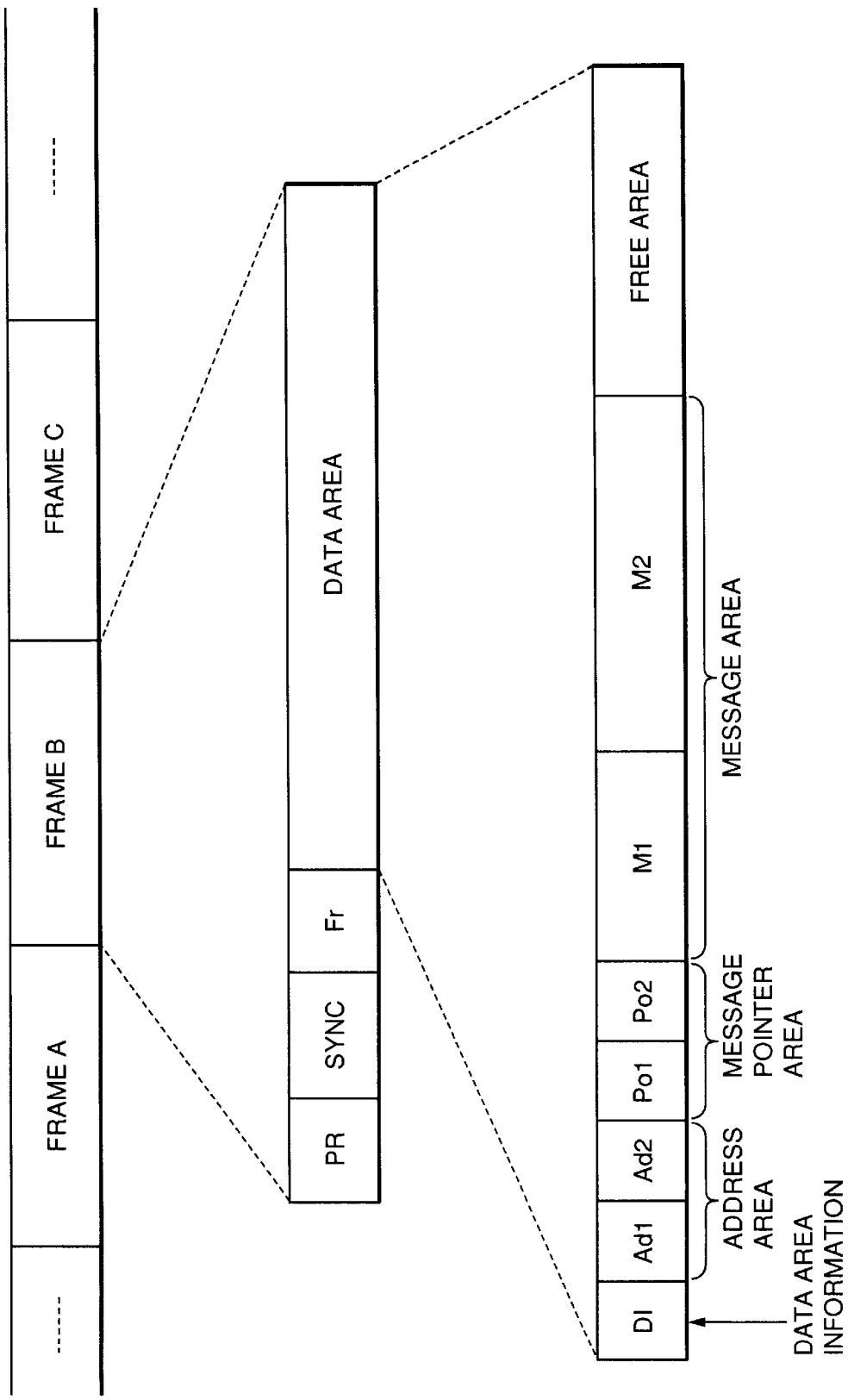

Fig.3(A)

| MESSAGE CONTENT |
|---|
| READOUT FLAG |
| SCHEDULE MESSAGE FLAG |
| POINTER TO AN ALARM TIME TABLE |
| OTHER ATTRIBUTES : MESSAGE STORAGE NUMBER, RECEPTION TIME, ETC. |

Fig.3(B)

MESSAGE TABLE 1:
| [03−20−12−15] CONFERENCE |
|---|
| 1 |
| 1 |
| 1 |

MESSAGE TABLE 2:
| TELEPHONE TO THE COMPANY! |
|---|
| 0 |
| 0 |
| 0 |

MESSAGE TABLE 3:
| [03−21−16−30] PRESENTATION MEETING |
|---|
| 0 |
| 1 |
| 2 |

MESSAGE TABLE 4:
| [03−22−20−00] CONFERENCE |
|---|
| 0 |
| 1 |
| 3 |

MESSAGE TABLE 5:
| THANKS A LOT |
|---|
| 0 |
| 0 |
| 0 |

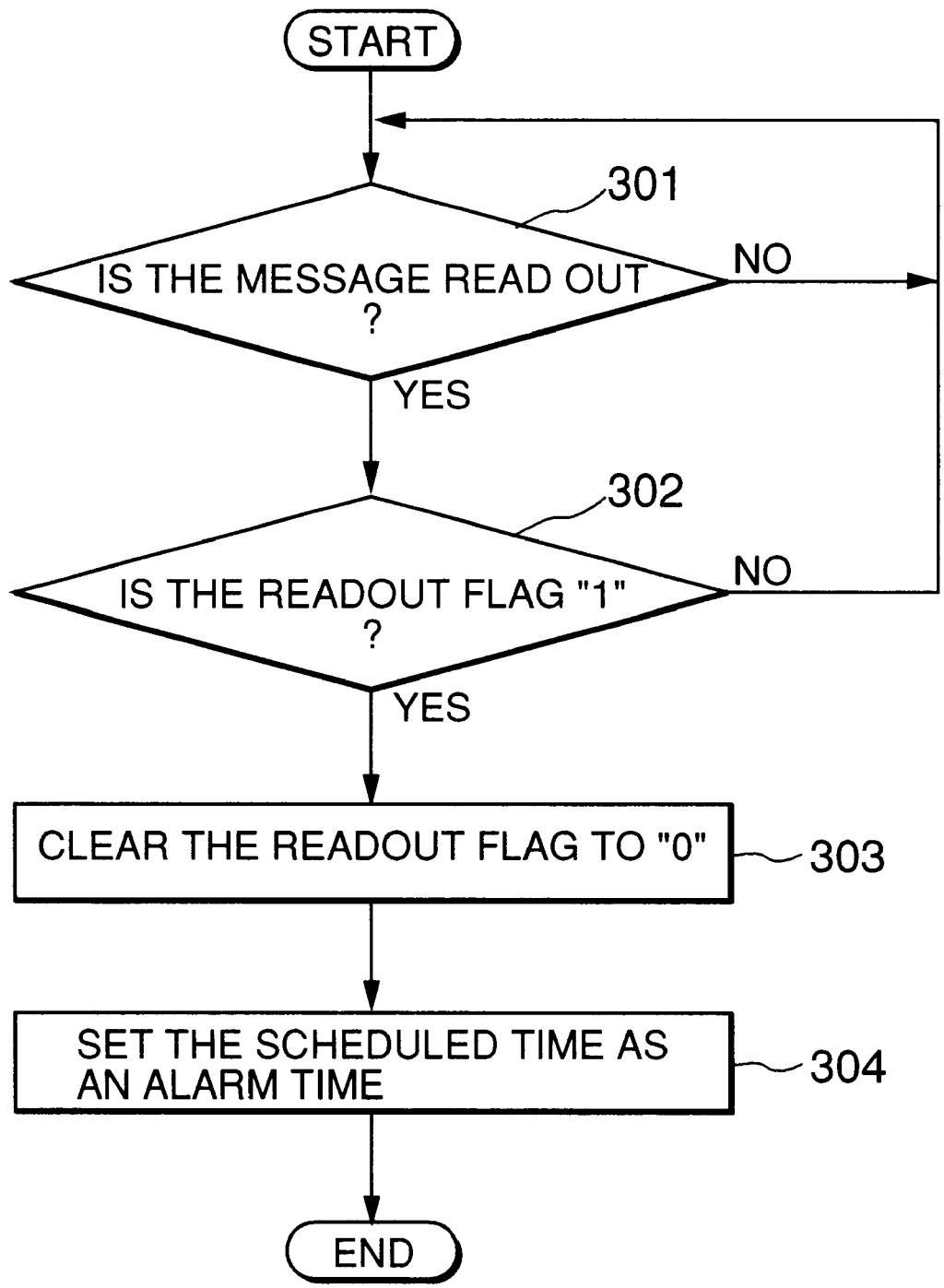

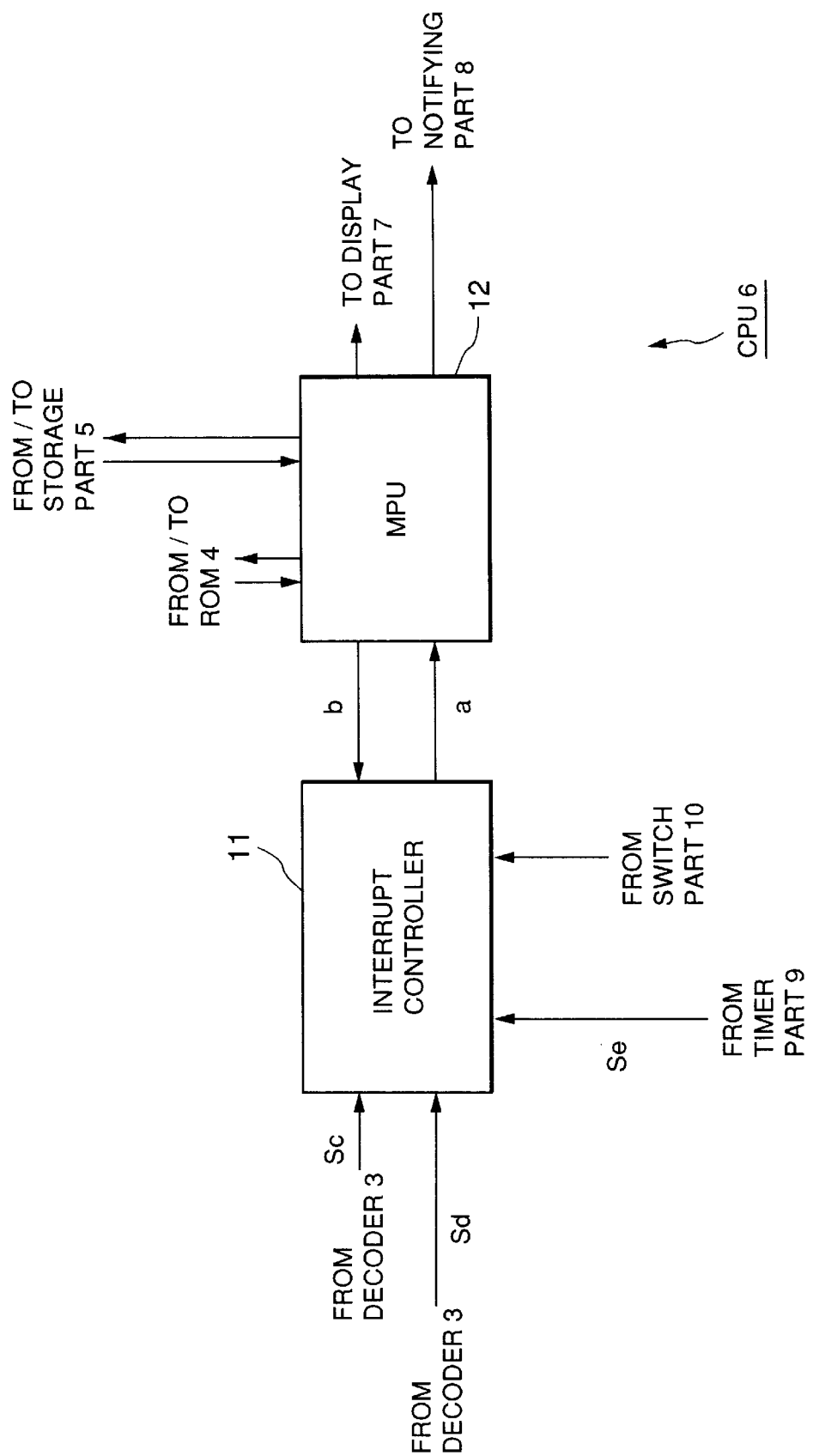

RADIO APPARATUS OUTPUTTING AN ALARM PRIOR TO A SCHEDULED TIME

BACKGROUND OF THE INVENTION

1. Field of the Invention

The present invention relates to a radio apparatus, and particularly to a radio apparatus which receives a schedule message and notifies a user of it.

2. Description of the Related Art

Generally in a data processing terminal such as a personal computer, an electronic notebook or the like, a user can register a schedule for himself. A data processing terminal of this kind compares the current time shown by its built-in clock with a time registered as a schedule with each other, and outputs and notifies an alarm to its user when both of them coincide with each other.

However, since a data processing terminal of this kind outputs an alarm when a scheduled time has come, its user is not aware of a schedule message until the scheduled time comes. Therefore, considering a user's moving time, the user may not be in time at a scheduled place. And there is also a problem that the user cannot prepare for the schedule.

In order to solve such problems, there is a data processing terminal having an alarming function for outputting an alarm earlier by a predetermined time than a scheduled time which the user registers for himself.

As a data processing terminal of this kind, for example, there is a data processing terminal disclosed in Japanese laid-open patent application heisei 6-161965.

This data processing terminal varies its alarm tone according to the length of time by which the alarm time is earlier than a scheduled time. For example, when the alarm time is five minutes before the scheduled time it outputs an alarm "peep", and when the alarm time is 30 minutes before the scheduled time it outputs an alarm "pip". In this way, this data processing terminal notifies its user how many minutes there are before the scheduled time comes by outputting different alarm tones.

However, since this data processing apparatus outputs an alarm for a schedule which the user has registered for himself, it cannot be applied to a radio apparatus which receives a schedule message from a sender and automatically stores it.

SUMMARY OF THE INVENTION

In consideration of the above-mentioned problems, an object of the invention is to output an alarm prior to a scheduled time corresponding to a schedule message sent from a sender.

Another object of the invention is to output an alarm prior to a scheduled time only in case that a user has not been aware of an alarm notification at the time of reception, as clearly known later.

Further another object of the invention is to make it possible for a user to optionally set a preceding alarm time by which an alarm is outputted earlier than a scheduled time, as clearly known later.

In order to achieve the above-mentioned objects, a radio apparatus of the present invention judges whether or not a user has confirmed reception of a schedule message in case that a received message is a schedule message. It changes a notification time when the schedule message is to be notified according to whether or not the user has confirmed reception of the schedule message.

In this composition, the present invention judges whether or not a message received by a receiving part is a schedule message. In case that a received message is a schedule message, a CPU judges whether or not a user has confirmed reception of the schedule message, namely, whether or not the user has pressed a switch part. In case that a CPU judges that the user has not confirmed reception of the schedule message, it notifies the schedule message at the time earlier by a predetermined preceding time than the scheduled time shown by the schedule message. On the other hand, in case that a CPU judges that the user has judged reception of a schedule message, it notifies the schedule message at a scheduled time shown by the schedule message.

Accordingly, since the present invention notifies an alarm prior to a scheduled time in case that a user has not been aware of notification of reception of a schedule message, the user can confirm in advance the content of the schedule message.

BRIEF DESCRIPTION OF THE DRAWINGS

These and other objects, features and advantages of the invention will become more fully apparent from the following detailed description taken in conjunction with accompanying drawings.

FIG. 1 is a block diagram illustrating the circuit configuration of a radio selective calling receiver of a preferred embodiment of the present invention.

FIG. 2 is a signal transmission format applied to a radio selective calling receiver of the invention.

FIGS. 3(A) and 3(B) illustrate a preferred storage example of received messages in a message storing area of the storage part shown in FIG. 1.

FIG. 11 is a flowchart for explaining operation of a preferred embodiment when the radio selective calling receiver shown in FIG. 1 reads out a message.

FIG. 12 illustrates the composition of a CPU shown in FIG. 1.

DETAILED DESCRIPTION OF THE PREFERRED EMBODIMENT

Figure 4A:
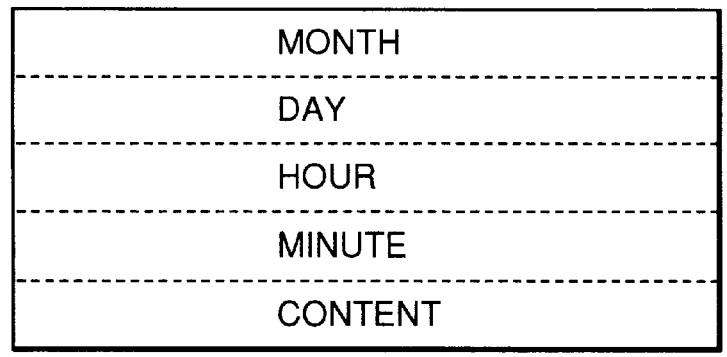
FIGS. 4(A) and 4(B) illustrate a preferred storage example of received messages in alarm time tables of the storage part shown in FIG. 1.

The circuit configuration of a radio apparatus, preferably, a radio selective calling receiver of the invention is described with reference to FIG. 1.

In FIG. 1, a receiving part 2 demodulates a radio signal Sa received by an antenna 1 from an unillustrated base station and outputs the demodulated signal Sb to a decoder 3. The decoder 3 detects a calling signal addressed to its own apparatus out of the demodulated signal Sb, and sends an interrupt signal Sd to a CPU 6 in case that it has found data addressed to its own apparatus. And the decoder 3 converts the demodulated signal Sb into a received data Sc in words and sends the received data Sc to the CPU 6. One word is a bit string of 32 bits in length and is composed of 21 information bits, 10 check bits and 1 parity bit. The information bits contain a call number, a message from a sender, and the like. The check bits are used for correcting an error which may occur in case of a bad reception state or the like. The parity bit is used for comfirming a correcting result of 21 information bits and 10 check bits.

The CPU 6 controls the respective parts on the basis of a program stored in advance in a ROM 4 and processes a message. Preferably, the CPU 6 receives an interrupt signal Sd from the decoder 2 and takes in the received data Sc. And the CPU 6 stores a message addressed to its own apparatus into a storage part 5 together with an attribute information as described later. Furthermore, the CPU 6 controls a notifying part 8 to perform an alarm notification of reception of a message and displays the received message on a display part 7. The alarm notification is performed by means of sound of a speaker, flicker of an LED, vibration of a vibrator, or the like.

After taking in received data Sc, the CPU 6 judges whether or not the received data Sc is a schedule message. A schedule message is a message containing a specific time information. In case that a schedule message is not confirmed or not read by a user, the CPU 6 compares an alarm time stored in the storage part 5 with the current time data Se from a timer 9. When a result of the comparison shows coincidence, an alarm notification is performed. Although described later, an alarm time is set at the time earlier by a predetermined preceding alarm time than a scheduled time. The preceding alarm time is determined in advance in consideration of a user's moving time or preparation time in relation to the content of a schedule message. The current time data Se is outputted at intervals of a predetermined time, for example, 1 minute by counting a reference clock generated inside the radio apparatus by means of the timer part 9. On the other hand, in case that a schedule message has been confirmed or read out by a user, the CPU 6 performs an alarm notification at an alarm time stored in the storage part 5. This alarm time coincides with a scheduled time in the schedule message. Once the user has confirmed a schedule message, since the user remembers the message, it does not have to notify an alarm in advance.

A signal transmission format applied to a radio selective calling receiver of the invention is described with reference to FIG. 2.

In FIG. 2, a signal transmission format applied to a radio selective calling receiver of the invention is composed of plural frames. Each of the frames is composed of a preamble signal PR for performing a bit synchronization, a synchronizing signal SYNC for performing a word synchronization, a frame signal Fr for showing the frame number of a transmission frame, and a data area for storing a call identification code or a transmission message. A preamble signal PR, a synchronization signal SYNC and a frame signal Fr need 0.1 second in total for example, and one frame needs 2 seconds for example. The radio selective calling receivers receive only frames assigned to them in advance.

On the other hand, a data area is composed of a data area information DI, address areas Ad1 and Ad2, message pointer areas Po1 and Po2, message areas M1 and M2, and a free area.

In a data area information DI, information related to the composition of a data area, for example, the starting position of an address area and the starting position of a message pointer area are stored. In address areas Ad1 and Ad2, the call identification code of a radio selective calling receiver is stored. In message pointer areas Po1 and Po2, the information for indicating a position where a message belonging to the address which exists in an address area exists starts in the data area and the information for showing the length of the message are stored.

In each of address areas Ad1 and Ad2, one call identification code is stored. The address areas Ad1 and Ad2, respectively, correspond to the message pointer areas Po1 and Po2 in relation of one-to-one correspondence. For example, a message pointer corresponding to an address Ad2 to be sent at the second time in the address area exists in the second pointer area Po2.

A schedule message in the invention is contained in a message area. A schedule message has a predetermined specific message format and is preferably represented by "[MM-DD-HH-mm] Contents", using brackets "[]" and a hyphen "-" in a message. MM represents month, DD represents day, HH represents hour, mm represents minute, and each of them has two figures. "Contents" shows the content of a schedule message, and is stored after a scheduled time shown by brackets "[]". For example, a schedule message represented by "[03-20-12-15] Conference" means "A conference is scheduled for fifteen minutes past twelve on March 20th".

Next, a preferred storage example of received messages in the storage part 5 shown in FIG. 1 is explained with reference to FIGS. 3(A) and 3(B) and FIGS. 4(A) and 4(B).

Figure 4B:
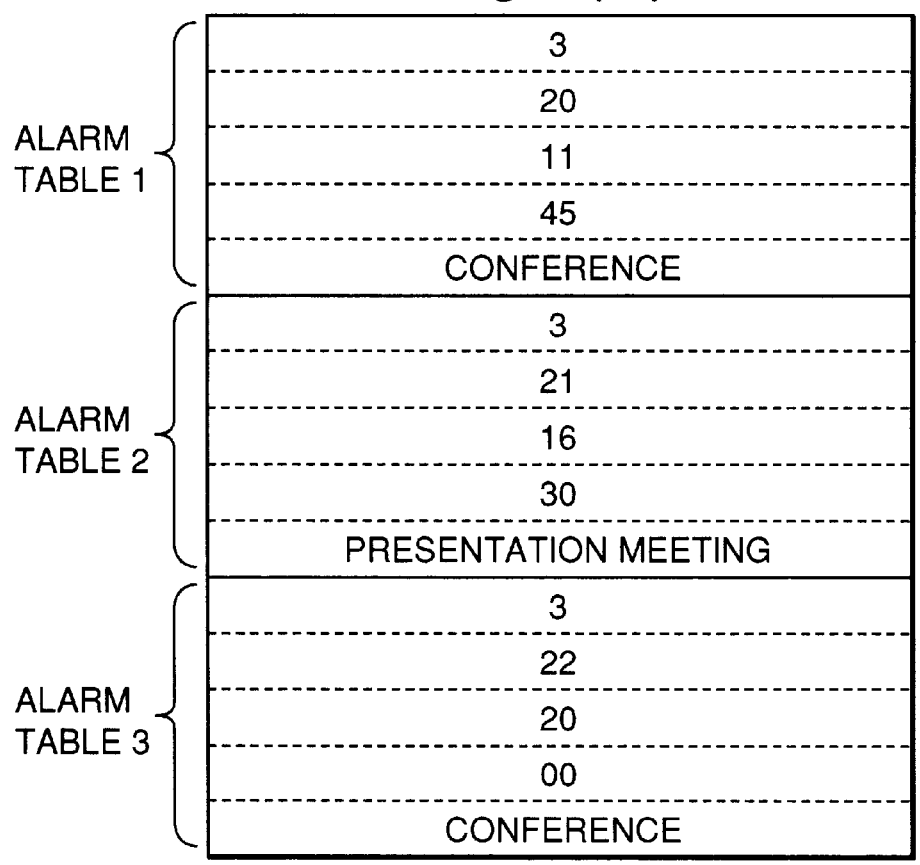

The storage part 5 is composed of a message storing area shown in FIGS. 3(A) and 3(B) and alarm time tables shown in FIGS. 4(A) and 4(B).

In FIG. 3(A), the message storing area stores received messages addressed to its own apparatus and their attribute information. A message attribute information includes a readout flag for showing whether or not a received message has been read out by a user, a schedule message flag for showing whether or not a received message is a schedule message, a pointer to an alarm time table, a message storage number, reception time, and the like. A message storage number indicates receiving order of message. As the readout flag, "1" is set in case that the received message has not been read out by the user and "0" is set in case that it has been read out. As the schedule message flag, "1" is set in case that the received message is a schedule message, and "0" is set in case that it is not a schedule message. A pointer to an alarm time table points a position on the table where an alarm time for a relevant schedule message is stored.

In FIG. 3(B), since a received message stored in a message table 1 has not been confirmed or not read out by a user, its readout flag is "1". On the other hand, since received messages stored in message tables 3 and 4 have been read out by the user, their readout flags are "0". And since the received messages stored in the message tables 1, 3 and 4 are schedule messages, their schedule message flags are "1". Furthermore, the alarm time of the schedule message stored in the message table 1 is stored in the alarm table 1, the pointer to the alarm time table is "1".

In FIG. 4(A), an alarm time table stores the alarm time of each schedule message and at least a part of its message content. In case that the relevant readout flag in a message storing area is "1", since the message has not been read out by the user, the alarm time of the schedule message is set at a preceding alarm time earlier by a predetermined time, for example, at the time earlier by 30 minutes than the scheduled time. The user sets optionally a preceding alarm time in advance by operating a switch part 10. The preceding alarm time may be stored in advance in the ROM 4 as a fixed value.

On the other hand, in case that the relevant readout flag in a message storing area is "0", since the message has been read out by the user, the alarm time of the schedule message is set at the same time as the scheduled time.

In FIG. 4(B), a received message stored in a message table 1 has not been read out by a user at the time of notification of reception. Accordingly, the time earlier by a predetermined preceding time than a scheduled time shown by the schedule message is set in an alarm table 1.

Received messages stored in message tables 3 and 4 have been read out by the user at the time of notification of reception. Accordingly, the scheduled times shown by the schedule messages are respectively set in alarm tables 2 and 3.

Next, another preferred storage example of received messages in the storage part 5 shown in FIG. 1 is explained with reference to FIGS. 3(A) and 3(B) and FIGS. 5(A) and 5(B).

Figure 5A:
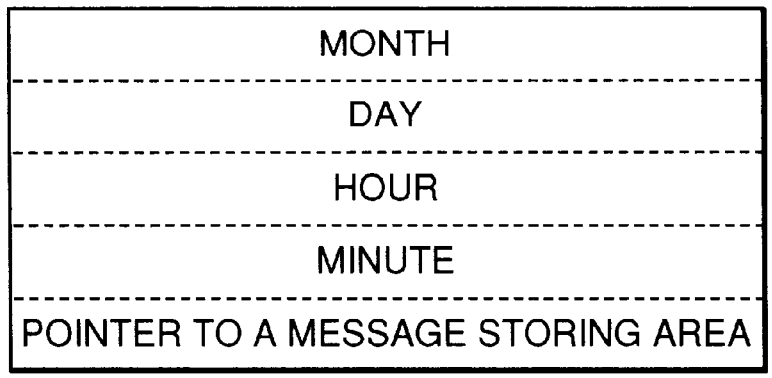
FIGS. 5(A) and 5(B) illustrate another preferred storage example of received messages in the alarm time tables of the storage part shown in FIG. 1.
Figure 5B:
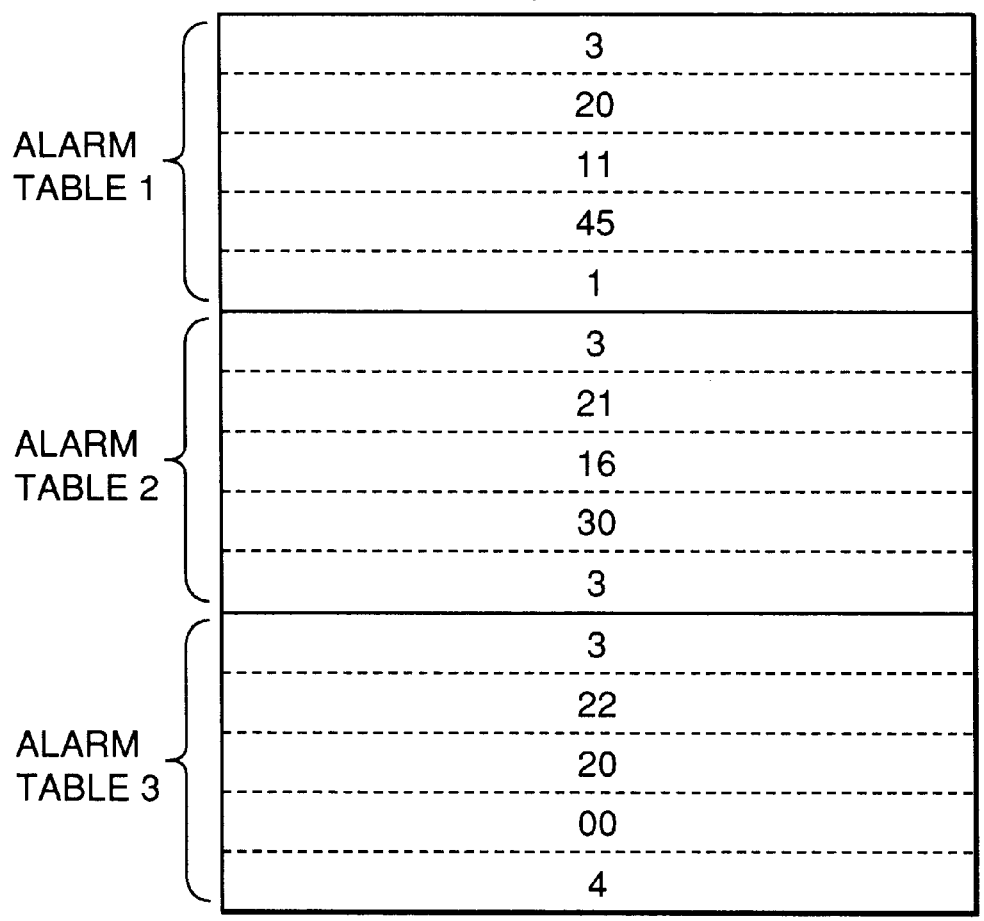

The storage part 5 is composed of a message storing area shown in FIGS. 3(A) and 3(B) and alarm time tables shown in FIGS. 5(A) and 5(B). Since the message storing area shown in FIGS. 3(A) and 3(B) has been described above, description of it is omitted to avoid redundancy.

An alarm time table shown in FIGS. 5(A) and 5(B) shares a message content shown in FIGS. 4(A) and 4(B) with a message content in the message storing area. Accordingly, a pointer to the message storing area is provided instead of the message content shown in FIGS. 3(A) and 3(B). According to this manner, since a plurality of the same messages are not stored in the alarm time tables, the memory can be effectively utilized.

Next, operation of a radio selective calling receiver of the invention is described in detail with reference to FIGS. 6 and 7.

Figure 6:
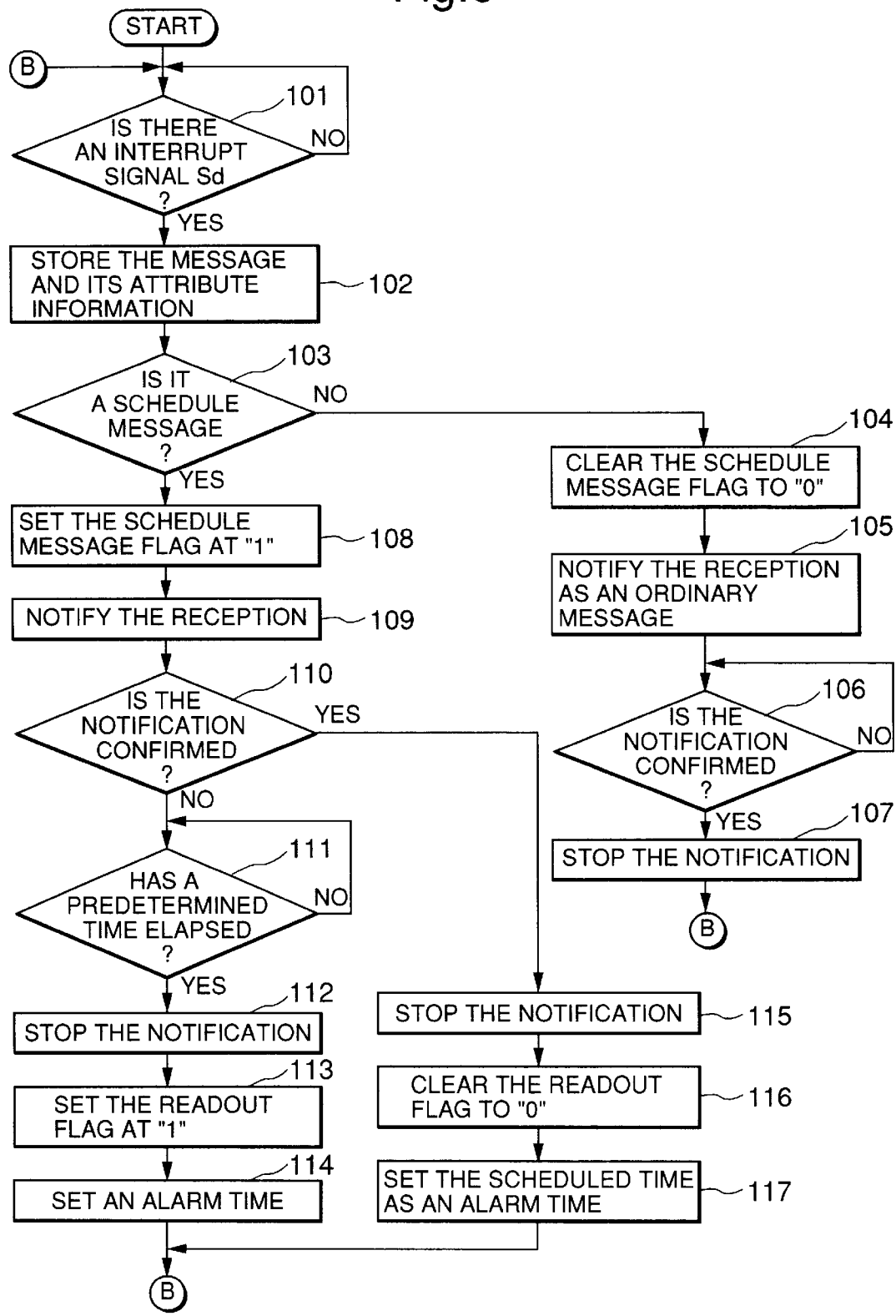
FIGS. 6 and 7 are flowcharts for explaining a preferred operation of the radio selective calling receiver shown in FIG. 1.

First, in FIG. 6, when an interrupt signal Sd showing that there is a data reception addressed to its own apparatus is inputted from the decoder 3 (Yes in step 101), the CPU 6 stores a received message into the storage part 5 together with its attribute information (step 102). The CPU 6 judges whether or not the received message is a schedule message (step 103). This judgement is performed on the basis of whether or not the received message has the predetermined message format.

In a process of step 103, in case that the received message is not a schedule message, a schedule message flag stored in the message storing area of the storage part 5 is cleared to "0" (step 104). After this, the CPU 6 performs a reception notification as an ordinary message through the notifying part 8 and displays the received message on the display part 7 (step 105). When a user confirms the notification by operating the switch part 10 (Yes in step 106), the notification is stopped (step 107). The reception notification may be automatically stopped when a predetermined time, for example, one minute has elapsed.

On the other hand, in a process of step 103, in case that a received message is a schedule message, the CPU 6 sets a schedule message flag stored in the message storing area of the storage part 5 at "1" (step 108), and performs a reception notification through the notifying part 8 (step 109). And the CPU 6 displays the received message on the display part 7. After this, it is judged whether or not the user has confirmed the notification by operating the switch part 10 (step 110).

In a process of step 110, when the user has confirmed the notification, the notification is stopped (step 115). Then, a readout flag stored in the message storing area of the storage part 5 is cleared to "0" (step 116). And an alarm time stored in an alarm time table of the storage part 5 is set (step 117). The alarm time is set at the same time as a scheduled time shown in the schedule message.

On the other hand, in a process of step 110, in case that the user does not confirm the notification, the notification is continued for a predetermined time, for example, one minute. When a predetermined time, for example, one minute has elapsed (Yes in step 111), the reception notification from the notifying part 8 is automatically stopped (step 112). And a readout flag stored in the message storing area of the storage part 5 is set at "1" (step 113). And an alarm time stored in an alarm time table of the storage part 5 is set (step 114). The alarm time is set at a predetermined preceding alarm time, for example, at the time earlier by 30 minutes than a scheduled time.

Figure 7:
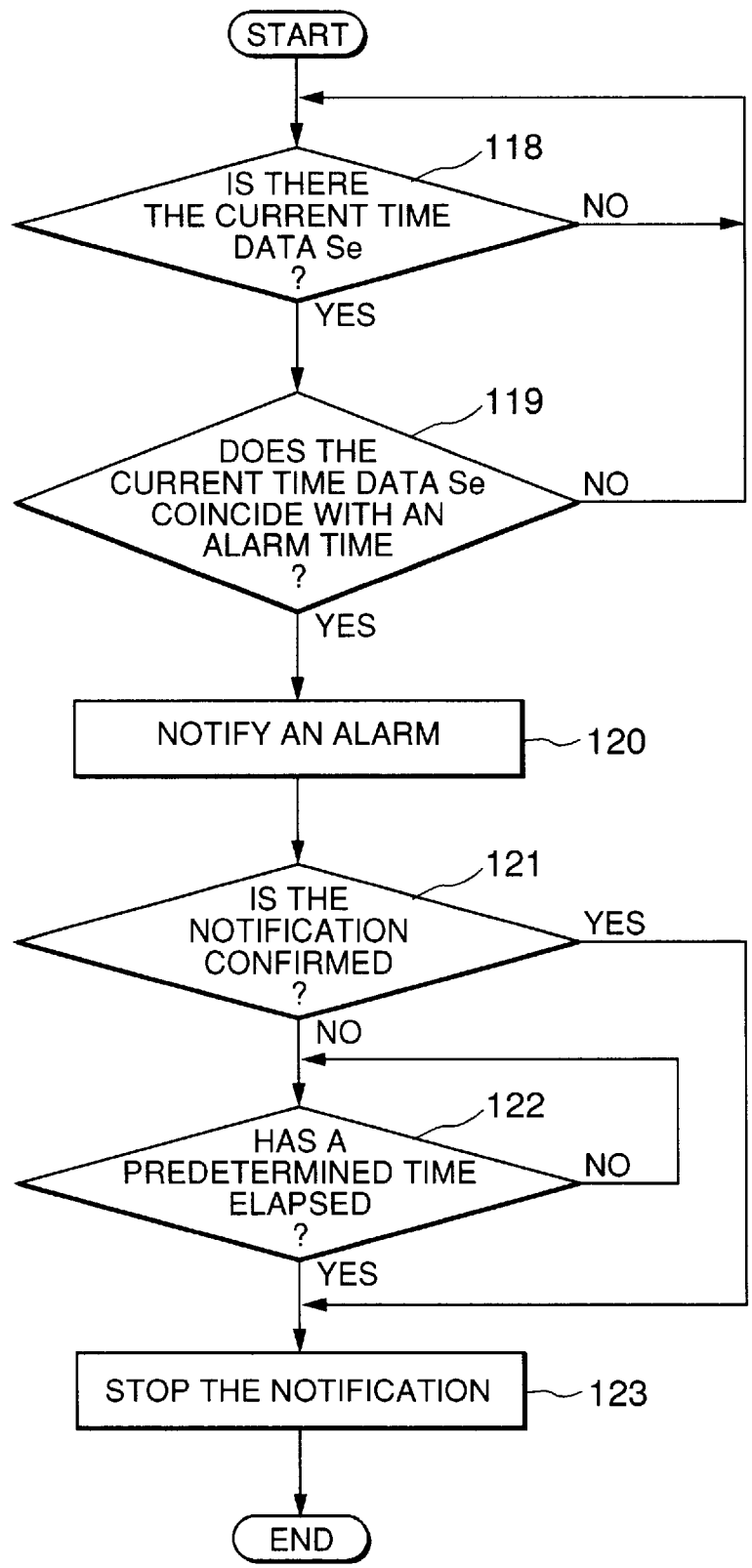

Next, in FIG. 7, it is described an operation at the time when the current time data Se is inputted to the CPU 6 from the timer part 9. First, it is judged whether or not there is the current time data Se outputted from the timer part 9 at intervals of a predetermined time, for example, one minute (step 118). This judgement may be executed after setting an alarm time in a process of step 114 or step 117. When the current time data Se is inputted, it is judged whether or not the current time data Se and the set alarm time coincide with each other (step 119).

In a process of step 119, in case that the current time data Se and the set alarm time coincide with each other, an alarm notification is performed through the notifying part 8 and the received message is displayed on the display part 7 (step 120). After this, it is judged whether or not the user has confirmed the notification by operating the switch part 10 (step 121). When the user has confirmed the notification (Yes in step 121), the alarm notification is stopped (step 123). And in case that the user does not confirm the notification, when a predetermined time, for example, one minute has elapsed (Yes in step 122), the alarm notification is stopped (step 123).

According to a radio selective calling receiver of the present invention having such a composition as this, in case that a schedule message is received and a user is not aware of reception of the schedule message, an alarm notification is performed at the time earlier by a predetermined preceding alarm time than a scheduled time. Therefore, the user can confirm the content of a schedule message in advance.

Next, another operation of a radio apparatus, particularly a radio selective calling receiver according to the invention is described in detail with reference to FIGS. 8 to 10.

Figure 8:
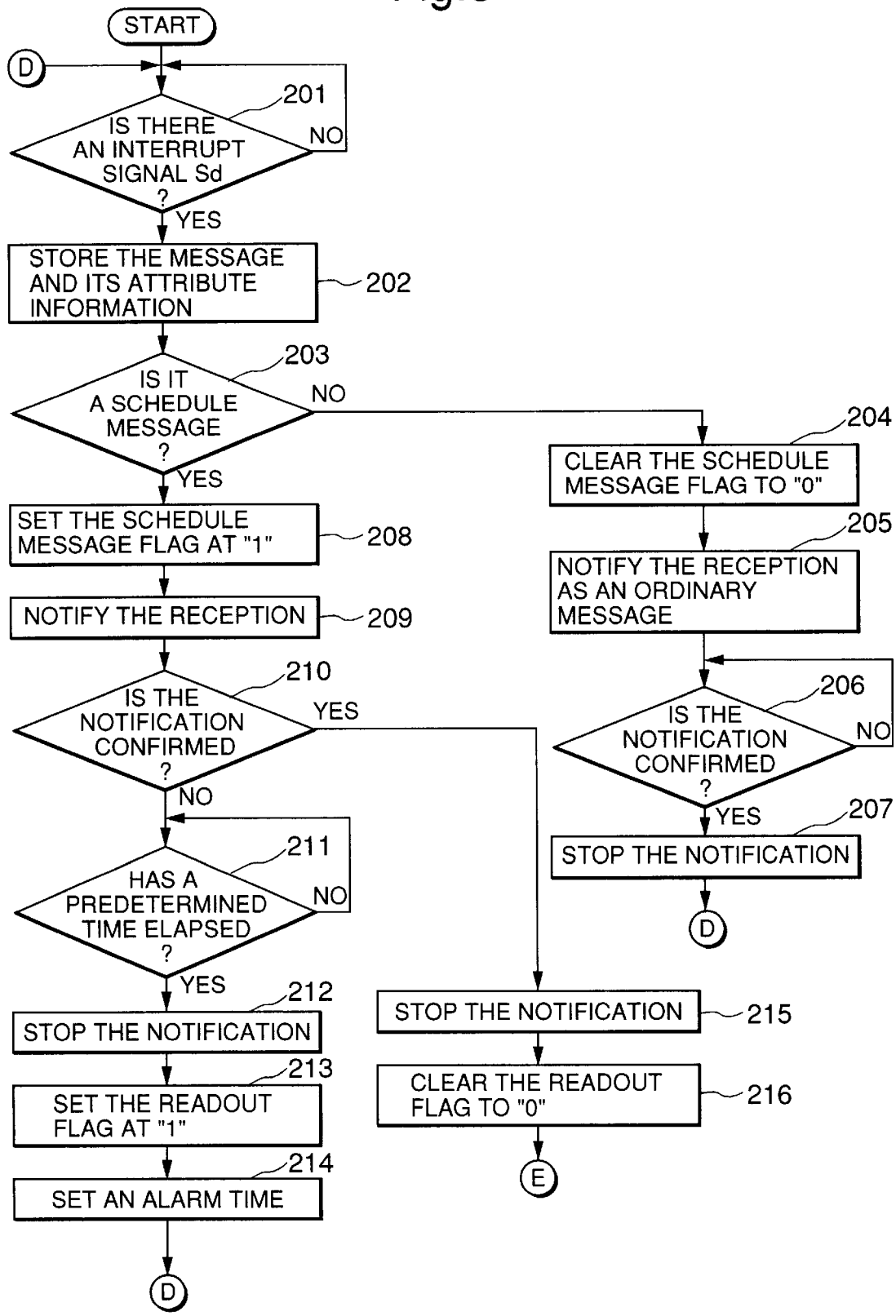
FIGS. 8 to 10 are flowcharts for explaining another preferred operation of the radio selective calling receiver shown in FIG. 1.

First, In FIG. 8, since operation in steps 201 to 214 is the same as steps 101 to 114 shown in FIGS. 5 and 6, description of it is omitted to avoid redundancy.

In a process of step 210, when the notification is confirmed by operating the switch part 10, the notification is stopped (step 215). And a readout flag stored in the message area of the storage part 5 is cleared to "0" (step 216). After this, as shown in FIG. 9, it is judged whether or not setting of a preceding time has been required by a user (step 217).

In a process of step 217, in case that setting of a preceding alarm time has not been required by a user, after a predetermined time, for example, the time of 3 minutes has elapsed (Yes in step 221), an alarm time stored in the alarm table of the storage part 5 is set (step 222). The alarm time is set at the same time as a scheduled time shown in the schedule message.

In a process of step 217, in case that setting of a preceding alarm time has been required by the user, the preceding alarm time is changed (step 218).

After this, in case that completion of setting a preceding alarm time has been required by the user (Yes in step 219), an alarm time stored in the alarm time table of the storage part 5 is set on the basis of the changed preceding alarm time (step 220). The alarm time is set at the time earlier by the changed preceding alarm time than the scheduled time shown in the schedule message.

Processes of steps 217, 218 and 219 are performed, for example, by that the user operates the switch part 10. More concretely, a preceding alarm time setting mode is brought by that the user presses a first switch (step 217). After this, each time the user presses a second switch, oneminute is added to the preceding alarm time (step 218). When the user presses the first switch again, the preceding alarm time is determined (step 219).

Figure 10:
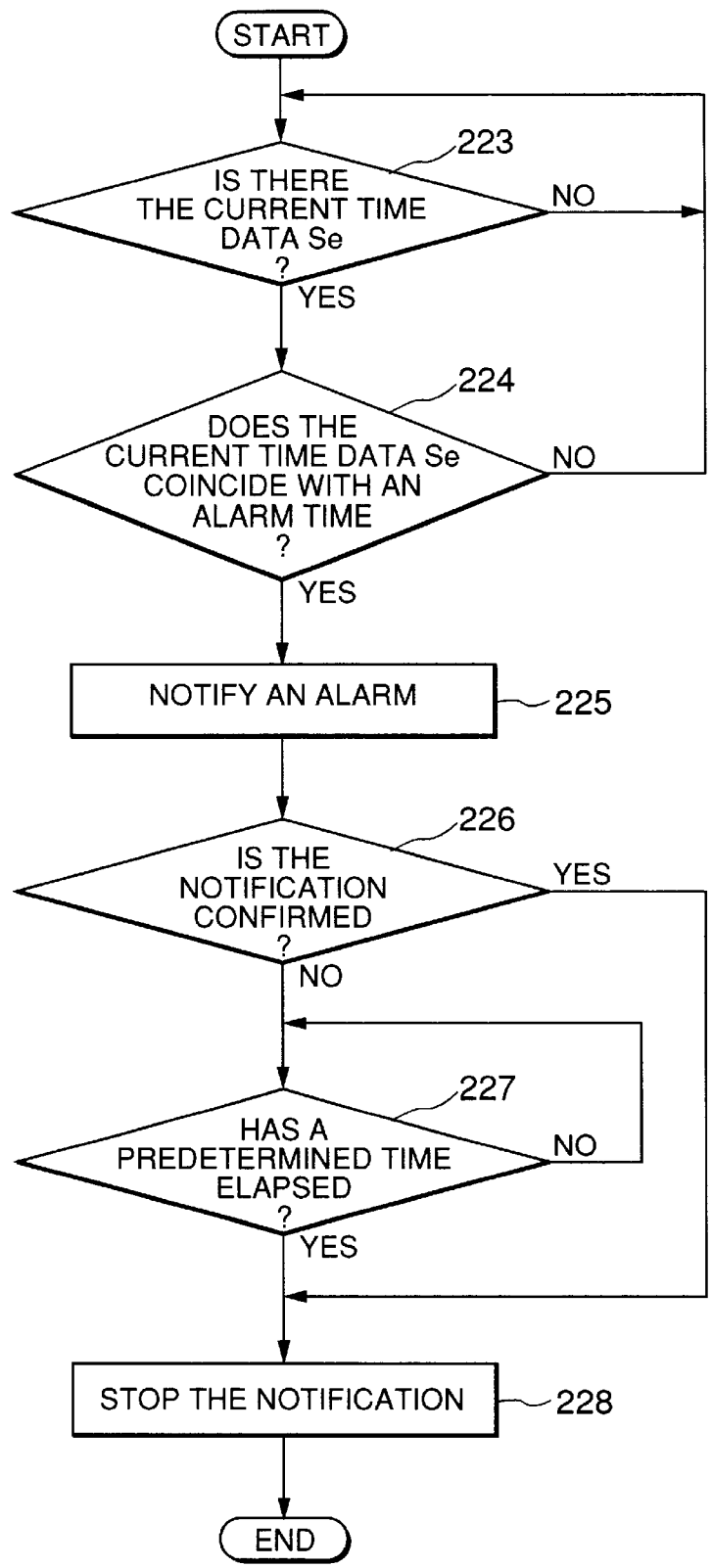

In FIG. 10, since operation in steps 223 to 228 is the same as steps 118 to 123 shown in FIGS. 7, description of it is omitted to avoid redundancy.

According to a radio selective calling receiver of the invention having such a composition as this, a user can set optionally a preceding alarm time according to the content of a schedule message after confirming the received schedule message.

Next, operation of a radio selective calling receiver of the invention at the time of reading out a message is described in detail with reference to FIG. 11.

First, it is judged whether or not a message has been read out by a user regardless of whether or not the user has confirmed a reception notification (step 301). Operation of reading out a message is performed, for example, by that a user presses the switch part 10. And when reading out a message, it is desirable to display the read-out message on the display part 7.

In a process of step 301, in case that a message has been read out by a user, it is judged whether or not a readout flag in the message storing area of the storage part 5 is "1" (step 302).

In a process of step 302, in case that it has been judged that a readout flag is "1", the readout flag is cleared to "0" (step 303). And the scheduled time shown in the schedule message is set as an alarm time (step 304).

Since operation after this is the same as operation in the processes of and after step 118 shown in FIG. 7, description of it is omitted to avoid redundancy.

Figure 9:
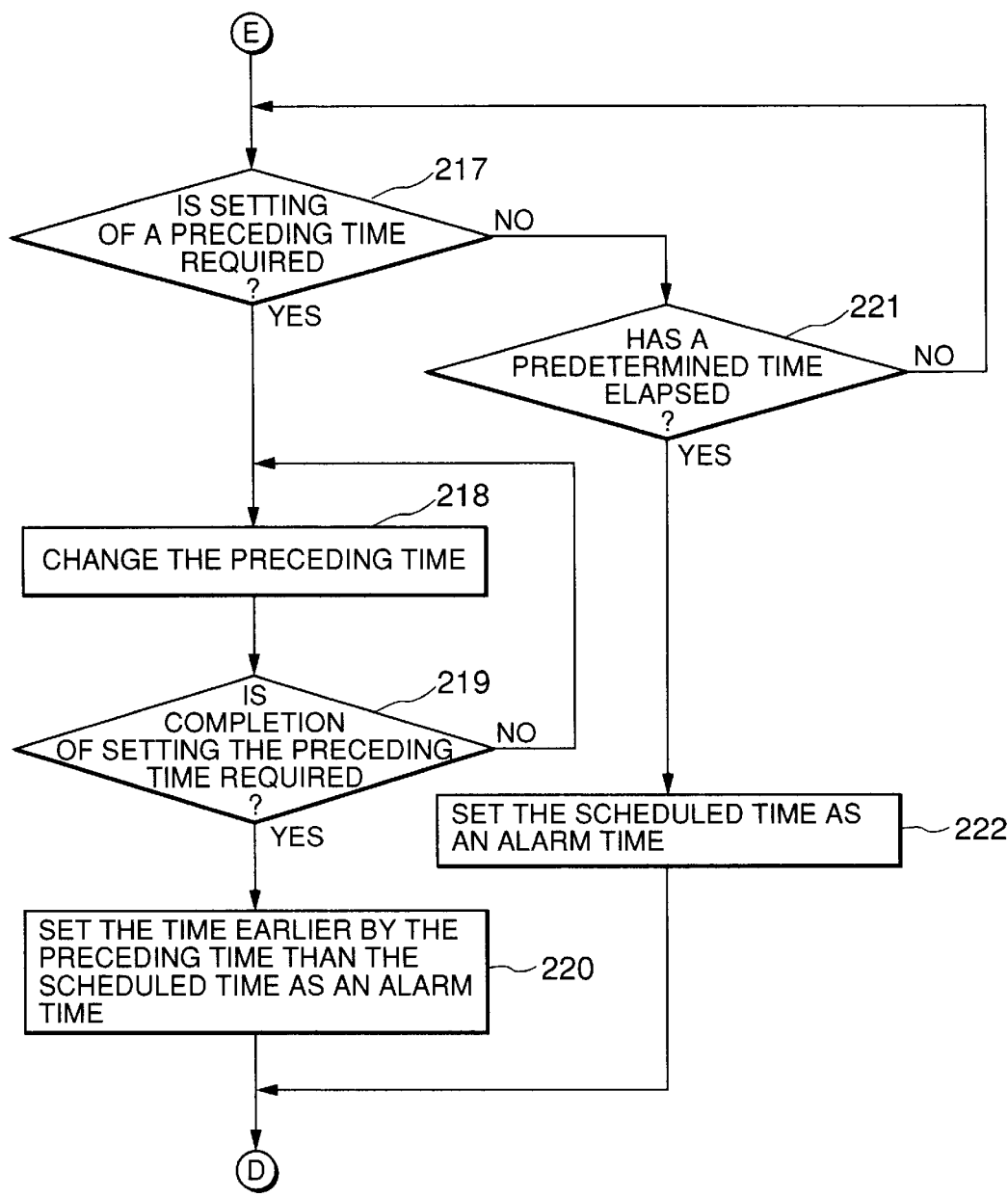

Since after a process of step 303, the processes of and after step 217 shown in FIGS. 9 and 10 may be performed.

Next, the internal circuit of a preferable example of the CPU 6 shown in FIG. 1 is described with reference to FIG. 12.

In FIG. 12, the CPU 6 is composed of an interrupt controller 11 and an MPU 12. "Z80" manufactured by ZILOG, Inc. is used as the MPU 12.

The interrupt controller 11 inputs a pulse signal outputted from the decoder 3, the timer part 9, or the switch part 10 into the MPU 12 as an interrupt signal a. The MPU 12 recognizes which the interrupt generating source is, the decoder 3 or the timer 9 or the switch part 5, on the basis of the interrupt signal a. After the recognition, the MPU 12 outputs an acknowledge signal b to the interrupt controller 11 and initializes an unillustrated register inside the interrupt controller 11.

When the MPU 12 has an interrupt signal a inputted from the decoder 3, it stores a received message into the storage part 5 on the basis of a program signal from the ROM 4. And the MPU 12 controls the notifying part 8 to perform a reception notification and displays the received message on the display part 7.

When the MPU 12 has an interrupt signal a inputted from the switch part 10, it processes the message stored in the storage part 5 on the basis of a program signal from the ROM 4. And when the MPU 12 has an interrupt signal "a" from the timer part 9, it compares an alarm time stored in the storage part 5 with the current time shown by the interrupt signal "a" on the basis of a program signal from the ROM 4.

As described above, since a radio apparatus according to the invention notifies an alarm prior to a scheduled time in case that a user has not become aware of notification of reception of a schedule message, the user can confirm in advance the content of the schedule message.

And since when a user confirms reception of a schedule message a radio apparatus according to the invention can optionally set a preceding alarm time for notifying an alarm prior to a scheduled time in consideration of a user's moving time or preparation time, it can notify an alarm at a more proper time according to the content of a schedule message.

Although this embodiment makes it possible for a user to optionally set a preceding alarm time when the user confirms reception of a schedule message, it is also possible to set an alarm time so as not to notify an alarm earlier than a scheduled time.

And it is also possible for a user to change again a preceding alarm time after setting the preceding alarm time.

It is preferable to use different notifying means, respectively, for notifying a message reception and notifying an alarm so that the user can distinguish between notification of a message reception and notification of an alarm. For example, it is preferable that a reception notification and an alarm notification are outputted from speakers different from each other. A reception notification and an alarm notification may be outputted with sound volumes different from each other. And a reception notification and an alarm notification may be outputted with tone colors different from each other. And a reception notification and an alarm notification may be outputted by at least one of a speaker, a vibrator, and an LED. At this time it is preferable that a reception notification and an alarm notification are outputted by combination of the output means different from each other.

And it is preferable to change over a notifying means between an alarm notification for notifying an alarm prior to a scheduled time and an alarm notification for notifying an alarm at the scheduled time. For example, it is preferable that the respective alarm notifications are outputted from speakers different from each other. The respective alarm notifications may be outputted with sound volumes different from each other. The respective alarm notifications may be outputted with tone colors different from each other. And the respective alarm notifications may be outputted by at least one of a speaker, a vibrator, and an LED. At this time it is preferable that the respective alarm notifications are outputted by combination of the output means different from each other.

Furthermore, although in this embodiment a radio selective calling receiver for receiving a schedule message has been explained as an example, the present invention is never limited to a radio selective calling receiver of this kind. Therefore, the present invention can be applied to all of radio apparatuses for receiving a schedule message.

Obviously, numerous additional modifications and variations of the present invention are possible in light of the above teachings. It is, therefore, to be understood that within the scope of the appended claims, the invention may be practiced otherwise than as specifically described herein.

What is claimed is:

1. A radio apparatus comprising:
   a receiving means for receiving a message;
   a first notifying means for notifying that said message has been received;
   a message judging means for judging whether or not said message is a schedule message;
   a reception judging means for judging whether or not a user has confirmed reception of said message when said schedule message has been received; and
   a second notifying means for notifying said schedule message at the time earlier by a predetermined time than a scheduled time shown by said schedule message in case that said judging means judges that the user has not confirmed reception of said schedule message.

2. A radio apparatus as claimed in claim 1, wherein said predetermined time comprises the time which the user can optionally set in advance.

3. A radio apparatus as claimed in claim 1, wherein said message judging means comprises a means which judges on the basis of whether or not said message has a predetermined format.

4. A radio apparatus as claimed in claim 1, wherein said first notifying means and said second notifying means notify by means of different means from each other.

5. A radio apparatus as claimed in claim 4, wherein said first notifying means and said second notifying means which are different from each other notify through speakers different from each other.

6. A radio apparatus as claimed in claim 4, wherein said first notifying means and said second notifying means which are different from each other notify with sound volumes different from each other.

7. A radio apparatus as claimed in claim 4, wherein said first notifying means and said second notifying means which are different from each other notify with tone colors different from each other.

8. A radio apparatus as claimed in claim 4, wherein said first notifying means and said second notifying means which are different from each other notify by means of at least one of a speaker, a vibrator and an LED, and have combination of the means different from each other.

9. A radio apparatus as claimed in claim 1, wherein said radio apparatus comprises a radio selective calling receiver.

10. A radio apparatus as claimed in claim 1, further comprises:
    A third notifying means for notifying said schedule message at the scheduled time shown by said schedule message in case that said reception judging means judges that the user has confirmed reception of said schedule message.

11. A radio apparatus as claimed in claim 10, wherein said second notifying means and said third notifying means notify by means of different means from each other.

12. A radio apparatus as claimed in claim 11, wherein said second notifying means and said third notifying means which are different from each other notify through speakers different from each other.

13. A radio apparatus as claimed in claim 11, wherein said second notifying means and said third notifying means which are different from each other notify with sound volumes different from each other.

14. A radio apparatus as claimed in claim 11, wherein said second notifying means and said third notifying means which are different from each other notify with tone colors different from each other.

15. A radio apparatus as claimed in claim 11, wherein said second notifying means and said third notifying means which are different from each other notify by means of at least one of a speaker, a vibrator and an LED, and have combination of the means different from each other.

16. A radio apparatus as claimed in claim 10, wherein said radio apparatus comprises a radio selective calling receiver.

17. A radio apparatus comprising:
    a receiving means for receiving a message;
    a first notifying means for notifying that said message has been received;
    a message judging means for judging whether or not said message is a schedule message;
    a reception judging means for judging whether or not a user has confirmed reception of said message when said schedule message has been received;
    a second notifying means for notifying said schedule message at the time earlier by a predetermined time than a scheduled time shown by said schedule message in case that said reception judging means judges that the user has not confirmed reception of said schedule message;
    a setting means which makes it possible for the user to optionally set a notification time for notifying said schedule message in case that said reception judging means judges that the user has confirmed reception of said schedule message; and
    a third notifying means for notifying said schedule message at said notification time set by said setting means.

18. A radio apparatus as claimed in claim 17, wherein said setting means comprises:
    a setting judging means for judging whether or not setting said notification time has been required;
    a changing means for changing said notification time; and
    a setting completion judging means for judging whether or not completion of setting said notification time has been required.

19. A radio apparatus as claimed in claim 17, further comprising:
    a fourth notifying means for notifying said schedule message at a scheduled time shown by said schedule message in case that the user does not set said notification time.

20. A radio apparatus as claimed in claim 17, wherein said fourth notifying means comprises:
    a means for notifying said schedule message at the scheduled time shown by said schedule message in case that a predetermined time has elapsed after said reception judging means has judged that the user has confirmed reception of said schedule message.

21. A radio apparatus as claimed in claim 17, wherein said radio apparatus comprises a radio selective calling receiver.

22. A radio apparatus comprising:
    a receiving means for receiving a message;
    a first notifying means for notifying that said message has been received;
    a message judging means for judging whether or not said message is a schedule message;
    a readout judging means for judging whether or not said schedule message has been read out; and
    a second notifying means for notifying said schedule message at a scheduled time shown by said schedule message in case that said schedule message has been read out.

23. A radio apparatus comprising:

a receiving means for receiving a message;

a first notifying means for notifying that said message has been received;

a message judging means for judging whether or not said message is a schedule message;

a readout judging means for judging whether or not said schedule message has been read out;

a setting means which makes it possible for the user to optionally set a notification time for notifying said schedule message in case that said schedule message has been read out; and a second notifying means for notifying said schedule message at said notification time set by said setting means.

24. A notification control method of a radio apparatus, comprising the steps of:

receiving a message;

judging whether or not said message is a schedule message;

notifying that said schedule message has been received;

judging whether or not a user has confirmed reception of said schedule message; and notifying said message at the time earlier by a predetermined time than a scheduled time shown by said schedule message in case that it is judged that the user has not confirmed reception of said schedule message.

25. A notification control method of a radio apparatus, comprising the steps of:

receiving a message;

judging whether or not said message is a schedule message;

notifying that said schedule message has been received;

judging whether or not a user has confirmed reception of said schedule message;

notifying said schedule message at the time earlier by a predetermined time than a scheduled time shown by said schedule message in case that it is judged that the user has not confirmed reception of said schedule message; and notifying said message at the scheduled time shown by said schedule message in case that it is judged that the user has confirmed reception of said schedule message.

26. A notification control method of a radio apparatus, comprising the steps of:

receiving a message;

judging whether or not said message is a schedule message;

notifying that said schedule message has been received;

judging whether or not a user has confirmed reception of said schedule message;

notifying said message at the time earlier by a predetermined time than a scheduled time shown by said schedule message in case that it is judged that the user has not confirmed reception of said schedule message;

allowing the user to optionally set a notification time for notifying said schedule message in case that it is judged that the user has confirmed reception of said schedule message; and notifying said schedule message at said set notification time.

27. A notification control method of a radio apparatus, comprising the steps of:

receiving a message;

judging whether or not said message is a schedule message;

notifying that said schedule message has been received;

judging whether or not a user has confirmed reception of said schedule message;

notifying said message at the time earlier by a predetermined time than a scheduled time shown by said schedule message in case that it is judged that the user has not confirmed reception of said schedule message;

allowing the user to optionally set a notification time for notifying said schedule message in case that it is judged that the user has confirmed reception of said schedule message;

notifying said schedule message at said set notification time; and notifying said schedule message at said scheduled time in case that said notification time has not been set.

* * * * *